Oct. 19, 1965

C. J. ARMOUR 3,213,350

VOLTAGE REGULATOR MEANS INTERRUPTING LOAD CURRENT
UPON EXCESSIVE LOAD VOLTAGES

Filed July 3, 1961

INVENTOR:
Charles J. Armour

By Smyth, Roston & Pavitt
Attorneys

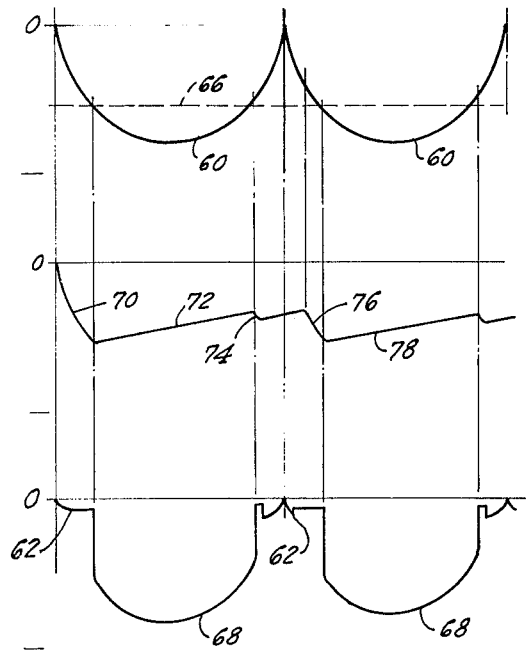

United States Patent Office 3,213,350
Patented Oct. 19, 1965

3,213,350
VOLTAGE REGULATOR MEANS INTERRUPT-
ING LOAD CURRENT UPON EXCESSIVE
LOAD VOLTAGES
Charles J. Armour, 3354½ Mentone Ave.,
Los Angeles, Calif.
Filed July 3, 1961, Ser. No. 121,569
5 Claims. (Cl. 321—18)

This invention relates to electrical circuitry for providing a regulated output voltage and more particularly relates to electrical circuitry for producing the regulated output voltage with a minimum loss of energy in the operation of such circuitry.

During the past number of years, electrical circuits have been used in a wide variety of systems. Each of these systems has required a power supply to provide electrical energy for the proper operation of the system. As the systems have become increasingly complex and increasingly sensitive in their operation, the supply of power required for the systems has progressively increased. Furthermore, the amount of power required by the systems at progressive instants of time has had to be regulated with increased accuracies in order to maintain the operation of the systems with minimum errors.

Another requirement in systems housed in small spaces has been that the power supplies operate efficiently so that a minimum loss of power is obtained. This has been necessary in order to maintain the power supplies at a minimum size and in order to prevent the power losses in the power supplies from increasing the temperature of the system. Increased temperatures are undesirable in systems providing sensitively controlled outputs since such temperatures produce variations in the operation of the systems.

Various attempts have been made to provide power supplies which will produce a regulated output voltage with minimum power losses in the supply. These attempts have not been entirely satisfactory for several important reasons. One reason has resulted from the fact that the components regulating the output voltage from the power supply have absorbed considerable energy in their operation so as to reduce the efficiency of the power supplies. Another reason has been that the power supplies have used relatively high input voltages in order to produce relatively low output voltages. The use of relatively high input voltages to produce low output voltages has resulted in increased losses in the power supply. This has been especially true when the power supplies have used alternating input voltages as inputs to produce direct output voltages.

This invention provides a power supply which overcomes the above difficulties. The power supply constituting this invention is advantageous because it is able to convert an alternating voltage into a regulated direct voltage with a loss of considerably less than 10% in energy and generally with a loss in the order of only 2 or 3% or less. The power supply constituting this invention is able to operate with these high efficiencies even when the amplitude of the input voltage is varied or when the characteristics of the load are varied.

The power supply constituting this invention obtains its high efficiencies by using switching means such as transistors or other current control members which have a relatively low dissipation of power when the switching means are in a first state corresponding to the state of conductivity of the transistors. The switching means are further advantageous since they provide a high impedance in a second state to prevent any flow of current through the switching means and accordingly any losses in the switching means. The power supply constituting this invention further obtains its high efficiency by providing for a passage of the alternating voltage to the load only when the amplitude of the alternating voltage is less than a particular value. The alternating voltage is prevented from being introduced to the load when the amplitude of the alternating voltage is equal to or greater than the particular value.

A pair of switching means such as transistors are used in the power supply constituting this invention. A first one of the transistors is connected in an electrical circuit with the source of alternating voltage and the load and is biased so as to be conductive during the occurrence of an alternating voltage having an amplitude less than a particular value. When the first transistor is conductive, current flows from the source of alternating voltage to the load.

The state of conductivity of the second transistor is controlled by the alternating voltage from the source. When the alternating voltage has an amplitude below the particular value, the second transistor is non-conductive. The second transistor becomes conductive when the alternating voltage from the source has an amplitude greater than the particular value. The second transistor is connected to the first transistor to produce a non-conductive state in the first transistor when the second transistor becomes conductive. Upon the production of a non-conductive state in the first transistor, the current from the source of alternating voltage to the load becomes interrupted.

In this way, the load receives an introduction of energy from the source of alternating voltage only when the alternating voltage has an amplitude less than the particular value. The control of the introduction of energy to the load in each cycle of the alternating voltage is obtained from switching means such as transistors or other current control members having low losses in their state of conductivity. Since the losses in the transistors are low and since the transistors are conductive only for low voltages, power losses in the power supply are minimized.

In the drawings:

FIGURE 3 illustrates voltage wave forms at strategic terminals in the embodiment shown in FIGURE 1.

Figure 1:
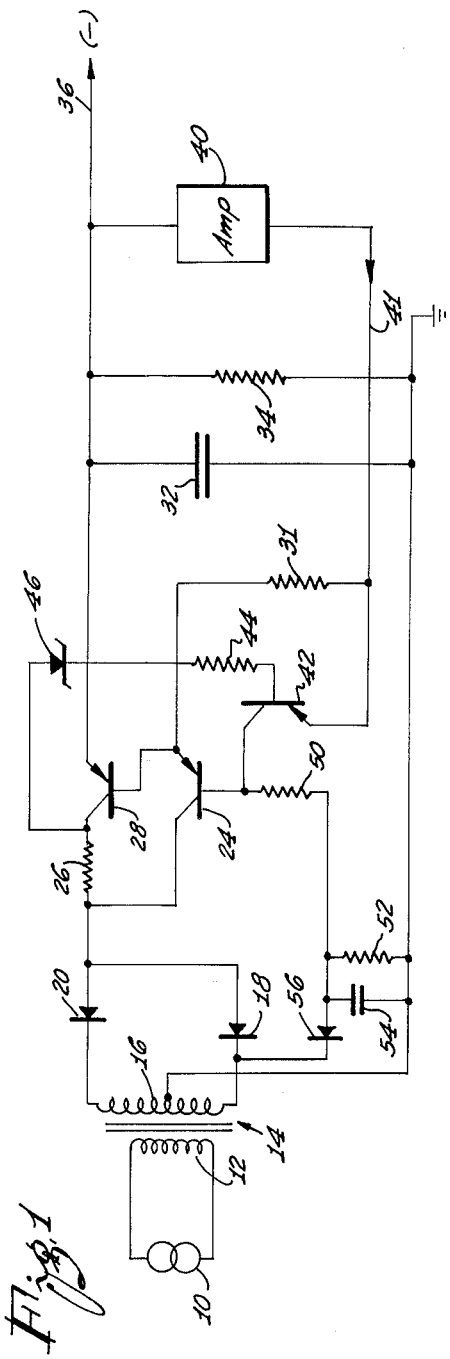
FIGURE 1 is a circuit diagram of a power supply constituting one embodiment of the invention.

In the embodiment of the invention shown in FIGURE 1, a source 10 of alternating voltage is connected to the primary winding 12 of a power transformer generally indicated at 14. The transformer 14 also includes a secondary winding 16 having a center tap connected to a reference potential such as ground. The end terminals of the secondary winding 16 are respectively connected to the cathodes of diodes 18 and 20, which may be types 1N253.

The anodes of the diodes 18 and 20 are connected to the collector of a transistor 24, which may be a PNP transistor such as a type 2N1136. A resistor 26 having a suitable value in the order of 0.2 ohm is disposed electrically between the anodes of the diodes 18 and 20 and the collector of a transistor 28, which may be a PNP transistor such as a type 2N677A.

The base of the transistor 28 has a common connection with the emitter of the transistor 24 and with one terminal of a resistor 31, which may have a value in the order of 220 ohms. A capacitor 32 and a resistor 34 are connected in parallel between the emitter of the transistor 28 and the reference potential such as ground. The capacitor 32 may have a value in the order of 2000 microfarads, and the resistor 34 may have a value in the order of 100 ohms. An output line 36 is also connected to the emitter of the transistor 28.

A feedback amplifier indicated in block form at 40 is connected at one end to the output line 36 and at the other end through a feedback line 41 to the emitter of a transistor 42, which may be a PNP transistor such as a type 2N1008. Since the amplifier 40 may be conventional, it is indicated in block form in FIGURE 1. The second terminal of the resistor 32 is also connected to the feedback line 41.

A resistor 44 and a Zener diode 46 are in series between the base of the transistor 42 and the collector of the transistor 28. Th anode of the Zener diode 46 has a common terminal with the collector of the transistor 28. The resistor 44 may have a suitable value in the order of 10 kilo-ohms, and the Zener diode 36 may be a type 1N752.

The collector of the transistor 42 and the base of the transistor 24 have a common terminal. A pair of resistors 50 and 52 are in series between this common terminal and the reference potential such as ground. Each of the resistors 50 and 52 may have a suitable value in the order of 1 kilo-ohm. A capacitor 54 having a value in the order of 50 microfarads is in parallel with the resistor 52. The anode of a diode 56 is connected to the ungrounded terminals of the resistor 52 and the capacitor 54, and the cathode of the diode 56 is connected to the cathode of the diode 18. The diode 56 may be a type 1N91.

In alternate half-cycles of the alternating voltage from the source 10, a negative voltage appears on the upper end terminal of the winding 16 in FIGURE 1. This voltage passes through the diode 20 and the resistor 26 to the collector of the transistor 28. In the other half-cycles of the alternating voltage, a negative voltage appears on the lower end terminal of the secondary winding 16 and passes through the diode 18 and the resistor 26 to the collector of the transistor 28. In this way, the transistor 28 receives a voltage of only a single polarity in each half-cycle. This voltage is indicated at 60 in FIGURE 3A as constituting successive half cycles of sine waves. As will be apparent from the subsequent discussion, one of the diodes 18 and 20 can be removed so that the transistor 28 receives a negative voltage only in alternating half-cycles.

The base of the transistor 28 is normally biased relative to the emitter of the transistor so that the transistor is conductive. This results from the operation of the diode 56, the capacitor 54 and the resistor 52 as a half wave rectifier in producing a direct voltage of negative polarity and in introducing this voltage to the base of the transistor 24 to make the transistor conductive. Because of the conductivity of the transistor 24, the negative voltage on the anodes of the diodes 18 and 20 appears on the emitter of the transistor 24 and on the base of the transistor 28 and biases the transistor 28 to a state of conductivity. The transistors 24 and 28 constitute cascade amplifiers in effect such that the current through the transistor 28 is amplified relative to the current through the transistor 24.

Because of the conductivity of the transistor 28, current flows through a circuit including the transistor 28, the capacitor 32 and the resistor 34 in parallel, the secondary winding 16, one of the diodes 18 and 20 and the resistor 26. The current flowing through the capacitor 32 charges the capacitor so that a negative voltage is produced on the output line 36 relative to the reference potential such as ground. The voltage produced across the capacitor 32 may be further filtered by stages (not shown) so that a direct output voltage having a constant magnitude is obtained. The voltage produced across the capacitor 32 during the flow of current through the transistor 28 is illustrated at 70 in FIGURE 3C.

The negative voltage produced on the output line 36 is amplified by the stage 40 and is introduced through the feedback line 41 to the emitter of the transistor 42. This voltage is compared with the alternating voltage on the collector of the transistor 28. When the difference between the voltage on the emitter of the transistor 42 and the voltage on the collector of the transistor 28 is less than a particular value, the Zener diode 46 presents a high impedance. This prevents the voltage on the collector of the transistor 28 from being introduced to the base of the transistor 42.

As the voltage on the collector of the transistor 28 continues to increase in magnitude in a negative direction from a value of 0 volts, the Zener diode 46 eventually breaks down because of the occurrence of a considerable voltage difference between the voltage on the collector of the transistor 28 and the emitter of the transistor 42. When the Zener diode 46 breaks down, the negative voltage on the collector of the transistor 28 is introduced substantially to the base of the transistor 42. This causes the transistor 42 to become conductive since the voltage on the base of the transistor is more negative than the voltage on the emitter of the transistor.

Upon the production of a state of conductivity in the transistor 42, current flows through a circuit including the transistor, the resistor 50, the resistor 52 and the capacitor 54 in parallel, the resistor 34 and the capacitor 32 in parallel and the amplifier 40. This current causes the potential on the collector of the transistor 42 to approach the potential on the emitter of the transistor 42. As previously described, the potential on the collector of the transistor 42 is normally biased at at negative potential of relatively great magnitude by the action of the half wave rectifier including the diode 56, the resistor 52 and the capacitor 54. The negative bias produced on the collector of the transistor 42 and the base of the transistor 24 by the half-wave rectifier is more negative than the potential produced on the collector of the transistor 42 and the base of the transistor 24 during the flow of current through the transistor 42. The resultant rise in a positive direction in the potential on the collector of the transistor 32 and the base of the transistor 24 is sufficient to make the transistor 24 non-conductive.

When the transistor 24 becomes non-conductive, the potential on the emitter of the transistor no longer follows the alternating voltage produced on the anodes of the diodes 18 and 20. This causes the potential on the emitter of the transistor 24 to be controlled by the potential on the feedback line 41. Because of this, the potential on the emitter of the transistor 24 and on the base of the transistor 28 rises in a positive direction to a value sufficient to cut off the flow of current through the transistor 28.

The production of a state of non-conductivity in the transistor 28 causes the secondary winding 16 to act as a choke and produce a back electromotive force opposing the reduction in the current through the secondary winding. This back electromotive force causes a negative voltage of increased magnitude to be produced on the collector of the transistor 28 and to be introduced to the base of the transistor 42. This causes the transistor 42 to become even more conductive than it would otherwise have been such that the transistor is driven to saturation. The flow of a saturating current through the transistor 42 causes the transistors 24 and 28 to become non-conductive in a positive and relatively instantaneous manner.

When the trransistor 28 becomes non-conductive, it continues to remain non-conductive during the time that the alternating voltage from the secondary winding 16 has an amplitude greater than a particular level illustrated at 66 in FIGURE 3. During the time that the transistor 28 is non-conductive, the alternating voltage from the secondary winding 16 is produced between the collector and emitter of the transistor, as illustrated at 68 in FIGURE 3C. When the magnitude of the alternating voltage decreases below the level 66, the transistors 24 and 28 again become conductive in a manner similar to that described above. This causes energy from the transformer 14 to be transferred to the load represented by the capacitor 32 and the resistor 34. The voltage produced across the transistor 28 during the flow of current through the transistor is illustrated at 62 in FIGURE 3C.

As will be seen from the above discussion, current flows through the load represented by the capacitor 32 and the resistor 34 during the time that the magnitude of the alternating voltage from the secondary winding 16 is below the level 66 in FIGURE 3A. This causes the capacitor 32 to become initially charged as illustrated at 70 in FIGURE 3B. The transistor 28 then becomes non-conductive and the capacitor 32 discharges through the resistor 34, as illustrated at 72 in FIGURE 3B. This discharge continues essentially until the beginning of a new half cycle of alternating voltage except for a brief interval 74 when the alternating voltage exceeds the voltage across the capacitor 32 because of the discharge of the capacitor.

In the second half cycle, the capacitor 32 becomes initially charged as illustrated at 76 and then becomes discharged as illustrated at 78. In this way, the voltage across the capacitor 32 is regulated at a particular direct voltage. The particular direct voltage is dependent upon the operation of the amplifier 40 and the voltage produced on the feedback line 41. This results from the fact that the feedback voltage on the line 41 controls the particular instant in each half cycle of the alternating voltage at which the transistor 42 becomes conductive and the transistors 24 and 28 become non-conductive. Thus, the output voltage on the line 36 may be varied by varying the feedback voltage on the line 41.

It will also be seen from the above discussion that the transistor 42 and the transistors 28 and 24 act as switches with no moving parts such that their response is quite rapid. The rapidity of the switching action is enhanced because a substantially constant current flows at all times in each half cycle through the resistor 50 from the half wave rectifier including the diode 56, the capacitor 54 and the resistor 52. The current normally flows through the transistor 24 but flows through the transistor 42 when the transistor 42 becomes conductive and the transistor 24 becomes non-conductive. Because of this flow of current, no transient time is required to change the magnitude of the current at different instants in each half cycle of alternating voltage.

The circuitry shown in FIGURE 1 provides substantially the same output as shown in FIGURE 3B regardless of any variations in the amplitude of the input voltage from the secondary winding 16. The circuitry operates properly regardless of variations in the amplitude of the input voltage since the circuitry passes power to the load only when the input voltage is less than a particular magnitude. Since the load does not receive any energy during the periods when the magnitude of the input voltage is above the particular level, variations in the peak amplitude of the input voltage have no effect on the load. This also causes the power supply constituting this invention to be insensitive to transients in the input voltage from the secondary winding 16.

The circuitry shown in FIGURE 1 also provides substantially the same output as shown in FIGURE 3B regardless of any variations in the load represented by the capacitor 32 and the resistor 34. This results from the fact that the resistance provided by the transistor 28 is low compared to that of the resistor 34 during the conductivity of the transistor such that the voltage from the secondary winding 16 appears substantially across the resistor.

Since the resistance provided by the transistors 28 and 24 is low compared to that of the resistor 34 during the conductivity of the transistors, the efficiency in the operation of the power supply is quite high. The efficiency in the operation of the transistor is further enhanced because of the low losses in the transistor 42. This causes the power supply constituting this invention to have an efficiency of at least 90% and generally as high as 97% or 98% or more. This is in contrast to efficiencies of 65% in the power supplies now in use.

It will be appreciated that the transistor 28 supports the voltage from the secondary winding 16 between its collector and its emitter during the time that the transistor is non-conductive. However, transistors can be obtained which will support as much as 500 volts and which will operate efficiently in the circuit.

The circuitry shown in FIGURE 1 and described above is responsive only to negative voltages. The circuitry may also be made responsive to positive voltages rather than negative voltages by replacing the PNP transistors 24, 28 and 42 by NPN transistors and by inverting the connections to the diodes 18 and 20. It will also be appreciated that the transistors 24, 28 and 42 may be replaced by other current control members having input, control and output electrodes respectively corresponding to the emitters, bases and collectors in the transistors.

Figure 2:
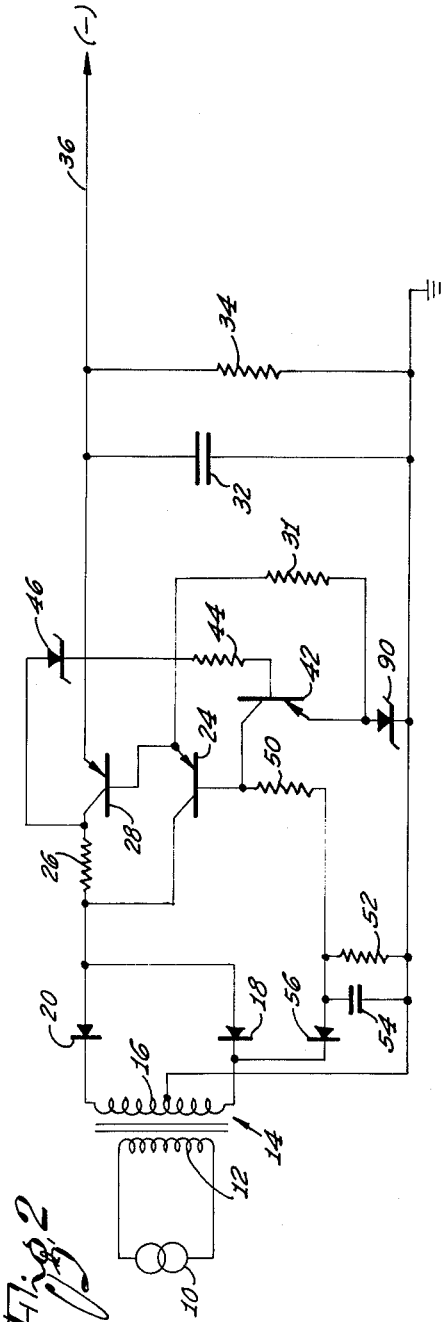
FIGURE 2 is a circuit diagram of a power supply constituting a modification of the supply shown in FIGURE 1.

The circuitry shown in FIGURE 2 is similar to the circuitry shown in FIGURE 1 except that the amplifier 40 has been replaced by a Zener diode 90. The cathode of the Zener diode 90 is disposed electrically at the reference potential such as ground and the anode of the Zener diode is connected to the feedback line 41. The Zener diode 90 is constructed to maintain a particular voltage across the diode such that a particular reference potential is produced on the feedback line 41. This reference potential is compared in the transistors 42 with the alternating voltage from the secondary winding 16 so as to control the conductivity of the transistor in a manner similar to that described above.

It will be appreciated that the system constituting this invention has a wide variety of uses in addition to its use as a power supply. For example, the system constituting this invention can be used as a system such as an amplifier for controlling the amount of work to be performed by a output member such as a motor, as a system such as a temperature oven for controlling the production of heat or as a servo system for providing a proportional control.

It will also be appreciated that the system constituting this invention can be used in an inverted manner without departing from the scope of the invention. For example, the system can be adapted to reject voltages below a particular magnitude and to use voltages above the particular magnitude in controlling the potential applied to the load.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. In combination,
a source of alternating potential,
a first current control member having conductive and non-conductive states and connected to the source of alternating potential to operate in the conductive state for magnitudes of the alternating potential below a particular level,
a load connected to the first current control member to receive a flow of current through the first current control member from the source during the operation of the first current control member in the conductive state,
means connected to the load for providing a reference potential,
a second current control member having conductive and non-conductive states,
means connected between the second current control member and the reference potential means for introducing the reference potential to the second current control member, control means connected between the source of alternating potential and the second current control member for providing an operation of the second current control member in the conductive state upon the occurrence of a potential difference greater than the particular level between the alternating and reference potentials and for providing an operation of the second current control member in the non-conductive state upon the occurrence of a potential difference less than the particular level between the alternating and reference potentials, and means connected between the first and second current control members for obtaining an operation of the first current control member in the non-conductive state upon the operation of the second current control member in the conductive state to prevent current from flowing from the source to the load for magnitudes of the alternating potential above the particular level.

2. The combination set forth in claim 1 wherein the control means includes a Zener diode and the first and second current control members constitute semiconductors.

3. In combination,
a source of alternating potential,
a first current control member having conductive and non-conductive states and having an input terminal, a control terminal and an output terminal,
a load connected to the input terminal of the first current control member,
means connecting the source of alternating potential to the output terminal of the first current control member to produce a conductive state in the current control member for magnitudes of the alternating potential below a particular level,
a second current control member having conductive and non-conductive states and having an input terminal, a control terminal and an output terminal,
means connected between the load and the input terminal of the second current control member for introducing a reference potential to the input terminal,
control means connected between the source of alternating potential and the control terminal of the second current control member for producing the conductive state in the second current control member upon the occurrence of a potential difference greater than the particular magnitude between the alternating potential and the reference potential, and
means connected between the output terminal of the second current control member and the control terminal of the first current control member to produce the non-conductive state in the first current control member upon the occurrence of the conductive state in the second current control member for the inhibition of a flow of current to the load for magnitudes of the alternating potential above the particular level.

4. The combination set forth in claim 3 wherein the first and second current control members are semiconductors.

5. The combination set forth in claim 4 wherein the control means includes a Zener diode.

References Cited by the Examiner
UNITED STATES PATENTS

| | | | |
|---|---|---|---|
| 2,776,382 | 1/57 | Jensen | 323—22 |
| 2,942,174 | 6/60 | Harrison | 323—22 |
| 2,967,991 | 1/61 | Deuitch | 323—22 |
| 3,048,718 | 8/62 | Starzec et al. | 323—22 |

LLOYD McCOLLUM, *Primary Examiner.*